(12) United States Patent
Mann

(10) Patent No.: US 7,013,930 B2
(45) Date of Patent: Mar. 21, 2006

(54) ELECTROSTATIC DISSIPATION

(75) Inventor: Michael Johnston Mann, Miami, FL (US)

(73) Assignee: 5 Tau, LLC, Miami, FL (US)

( * ) Notice: Subject to any disclaimer, the term of this patent is extended or adjusted under 35 U.S.C. 154(b) by 127 days.

(21) Appl. No.: 10/621,180

(22) Filed: Jul. 16, 2003

(65) Prior Publication Data
US 2004/0154687 A1 Aug. 12, 2004

Related U.S. Application Data

(63) Continuation-in-part of application No. 10/360,700, filed on Feb. 6, 2003, now abandoned.

(51) Int. Cl.
*B65B 3/04* (2006.01)
(52) U.S. Cl. .............. 141/1; 141/11; 141/94; 141/97; 141/192; 141/98; 361/215
(58) Field of Classification Search .......... 141/1, 141/11, 94, 97, 98, 192; 361/212, 215, 216
See application file for complete search history.

(56) References Cited

U.S. PATENT DOCUMENTS

| 3,099,774 A | 7/1963 | Crane ............................. 317/2 |
| 4,633,364 A | 12/1986 | Nakamura et al. .......... 361/216 |
| 5,186,357 A | 2/1993 | Foster ........................... 232/1 |
| 5,761,022 A | 6/1998 | Rankilor ..................... 361/214 |
| 5,825,605 A | 10/1998 | Sutherland .................. 361/216 |
| 6,193,500 B1 * | 2/2001 | Bradt et al. ................... 431/5 |
| 6,326,934 B1 * | 12/2001 | Kinzie ........................ 345/1.1 |
| 6,401,767 B1 | 6/2002 | Cohen et al. .................. 141/1 |

OTHER PUBLICATIONS

Static Control Products and Services Catalog 1992/1993, 3M Corporation, Copyright 1992 (copy enclosed—except pp. 2, 4, 24, 34, 52, 70 74 and 80 which are blank).

* cited by examiner

*Primary Examiner*—Justine R. Yu
*Assistant Examiner*—Peter deVore
(74) *Attorney, Agent, or Firm*—Charles L. Schwab; Nexsen Pruet, LLC

(57) ABSTRACT

A fueling station is provided with apparatus for preventing accidental fires including communication with the person performing the fueling operation and preventing fuel delivery unless the person performing the fueling operation is safely purged of static electricity. Also a vehicle is provided with static discharge pad apparatus for safely discharging static electricity of a person leaving the vehicle.

11 Claims, 5 Drawing Sheets

US 7,013,930 B2

ELECTROSTATIC DISSIPATION

This application is a continuation-in-part of prior application Ser. No. 10/360,700 filed on Feb. 6, 2003, abandoned.

TECHNICAL FIELD

This invention relates to apparatus and methods for prevention of accidental fires at fueling stations and more particularly to safely dissipating the static electricity of the person performing a fueling operation so as to prevent occurrence of a spark initiated ignition of gasoline fumes present during the fueling operation.

BACKGROUND OF THE INVENTION

Accidental fires at fueling stations have been ignited by the static discharge from the person performing the fueling operation. The desirability of safely dissipating static electricity in the vicinity of fuel pumps has been recognized as evidenced by U.S. Pat. No. 6,401,767 issued Jun. 11, 2002 to J. P. Cohen et al for Apparatus and Method for Grounding Compressed Fuel Fueling Operator wherein the nozzle is locked in the fuel tank until the operator activates a grounding switch. U.S. Pat. No. 5,186,357 issued Feb. 16, 1993 to R. C. Foster for a Fuel Dispensing System Having A Flexible Hose with a Static Dissipater and a Fuel Leak Detector provides apparatus for detecting leakage between an underground storage tank and a fuel pump together with apparatus for dissipating static from the pump to the underground fuel tank. This last mentioned U.S. patent also discloses apparatus for dissipating the static electricity from the fuel pump hose used to fill the gas tank of an automotive vehicle.

BRIEF SUMMARY OF THE INVENTION

In one embodiment of the invention, a method and apparatus are provided for dissipating the electrostatic condition of a person fueling a vehicle from a gas pump. A static discharge sign at the gas pump includes a grounded touch area with instructions for discharging personal static.

In a second embodiment of the invention a motion detector is provided at the pump to detect a person approaching the pump to engage in a fueling operation. The motion detector activates a recorded message module which includes a speaker. Upon detecting the presence of a person the message module automatically causes the recorded message to be issued through the speaker telling the fueling person to place his or her hand on the static discharge sign which is located on or adjacent the fuel pump. The static discharge sign includes a touch sensor which, when troubled, operates a switch in the fuel pump control circuit to permit it to run, provided the normal fueling steps have been taken i.e. payment, gasoline type selection and operation of the fueling nozzle.

In a third embodiment of the invention, static discharge pads or signs are placed on the inside and/or outside of the driver's side door of a vehicle to facilitate personal static discharge as the driver leaves the vehicle.

It is a primary object of the invention to reduce the fire hazard attendant the fueling of a vehicle. It is a further object of the invention to provide a fueling station where the person obtaining fuel must first discharge personal static electricity. It is also an object of the invention to provide static discharge pads on a vehicle facilitating safe discharge of personal static electricity when the driver leaves the vehicle. In all versions of the invention the touch pads are made of a material providing a sufficiently slow discharge of personal static electricity to avoid a spark when touched.

BRIEF DESCRIPTION OF THE DRAWINGS

The invention is illustrated in the accompanying drawings, in which.

DETAILED DESCRIPTION OF THE INVENTION

Figure 1:
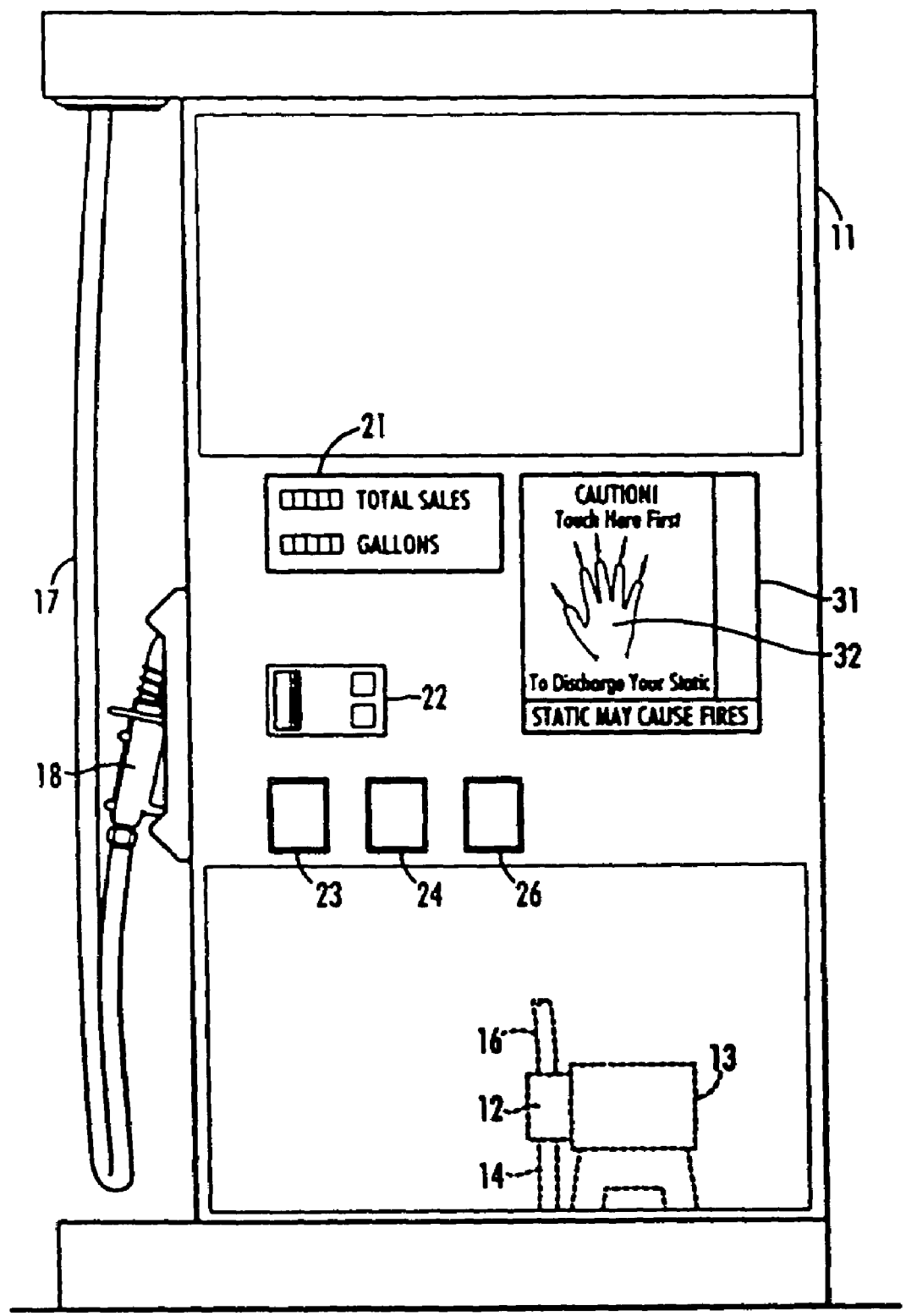
FIG. 1 shows a fuel pump with a static discharge sign having a touch area for discharging personal static.

Referring to FIG. 1, the fueling station or module 11 includes a fuel pump 12 driven by an elective motor 13. An inlet hose 14 is connected to an underground storage tank, not shown and an outlet hose 16 is connected to a delivery hose 17 having an appropriate nozzle 18 on its end. The fueling module 11 has the usual visual indicator panel 21 showing total sales and gallons delivered by the fueling module 11, a credit card payment device 22 and manually operated fuel grade selection pads 23, 24, 26. In order to improve the safety of the fueling operation, a caution sign or panel 31 is attached to the fueling module 11 which not only includes safety instructions concerning fueling but also includes a hand print marked area or touch area 32 which is grounded to effect a controlled, non-spark discharge of the electro-static charge of the individual touching the area 32. The touch area 32 or the entire panel 31 is made of a material providing sufficiently slow discharge of electrostatic electricity to avoid an electrical spark. Preferably the resistance of the touch area material is between $10^6$ and $10^{11}$ ohms. Thus a convenient static discharge structure is provided at or adjacent the pump module 11 to minimize possible ignition of gas fumes at a fueling station.

Figure 2:
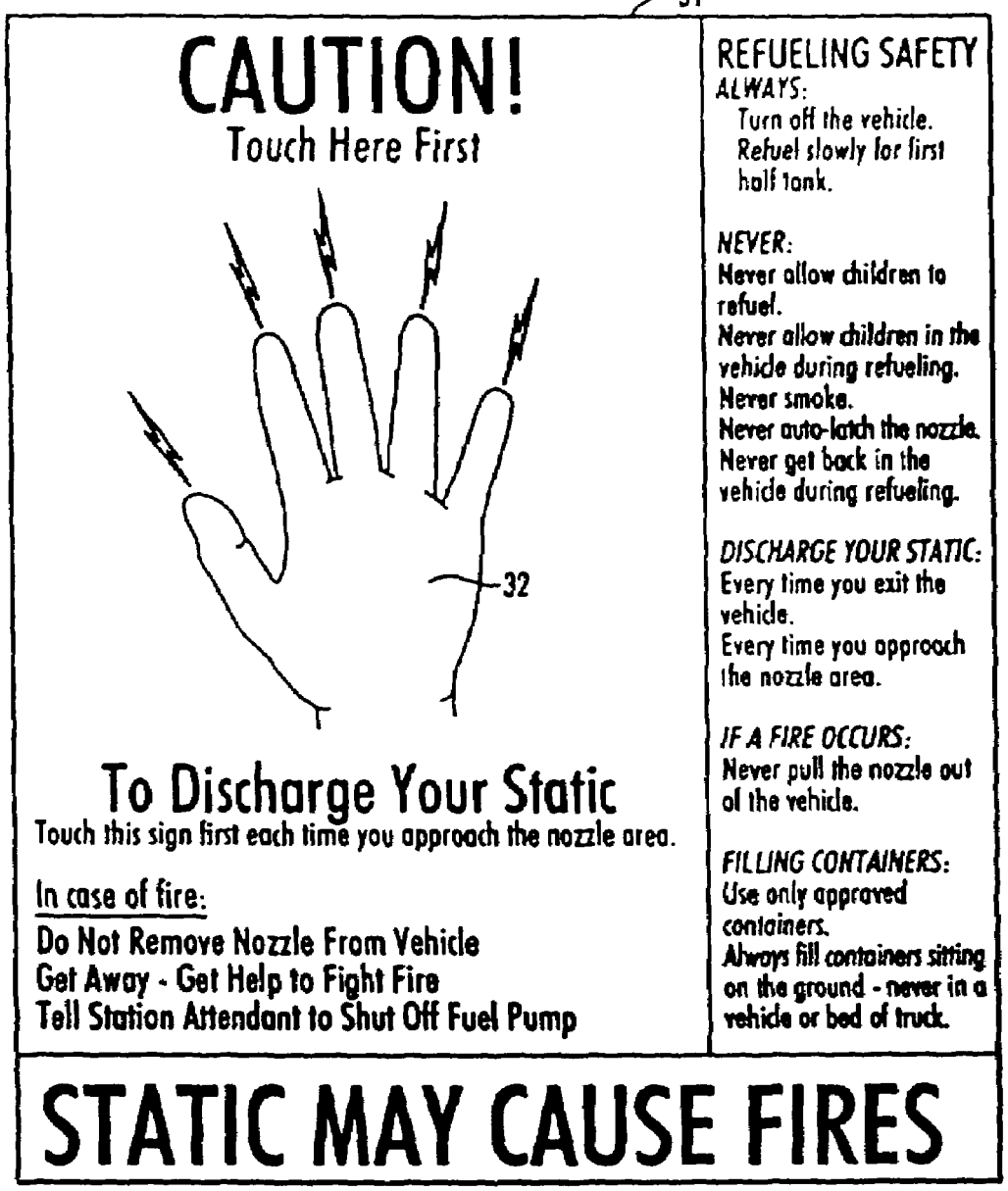
FIG. 2 is an enlarged view of the sign shown in FIG. 1.

FIG. 2 is an enlarged view of the caution panel 31 shown in FIG. 1. It includes instructions for discharging individual static, what to do in case of fire and refueling safety rules.

Figure 3:
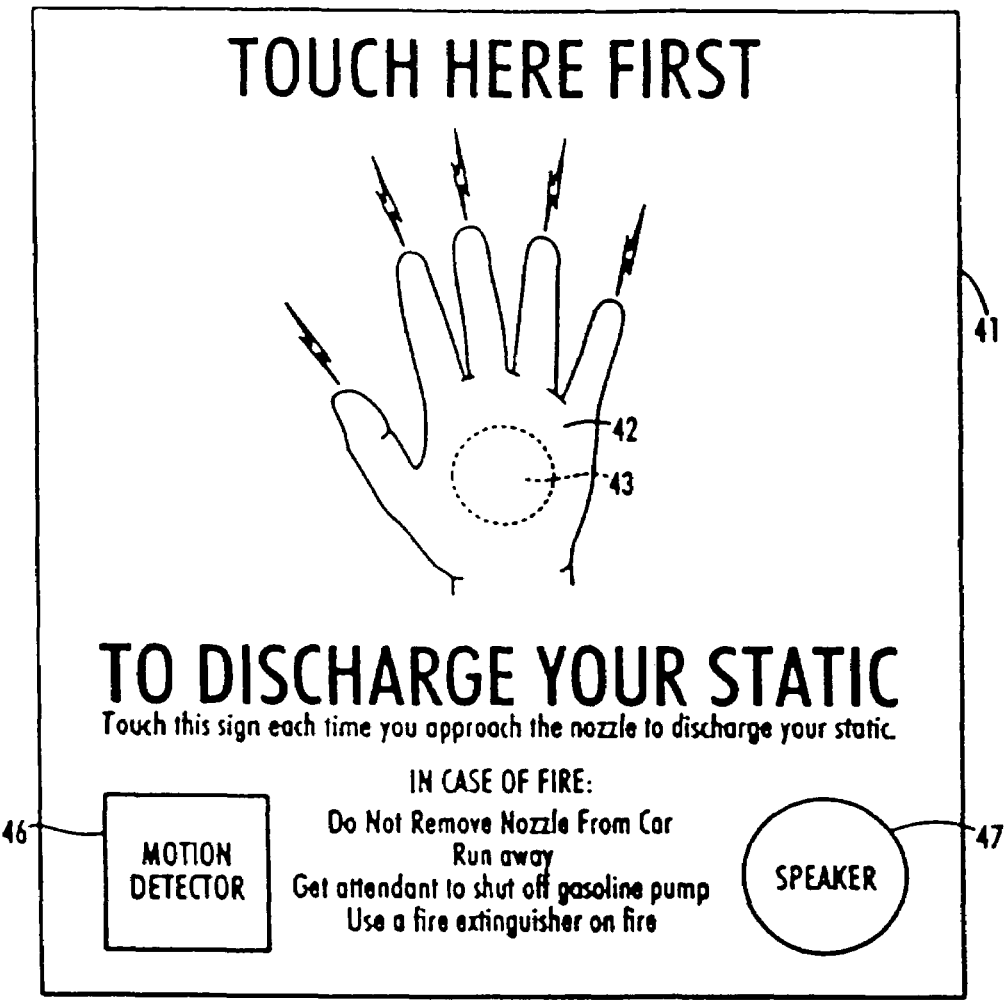
FIG. 3 is an alternate sign to that shown in FIG. 2, which in addition to the static discharge touch area, includes a touch sensor, motion detector and speaker.
Figure 4:
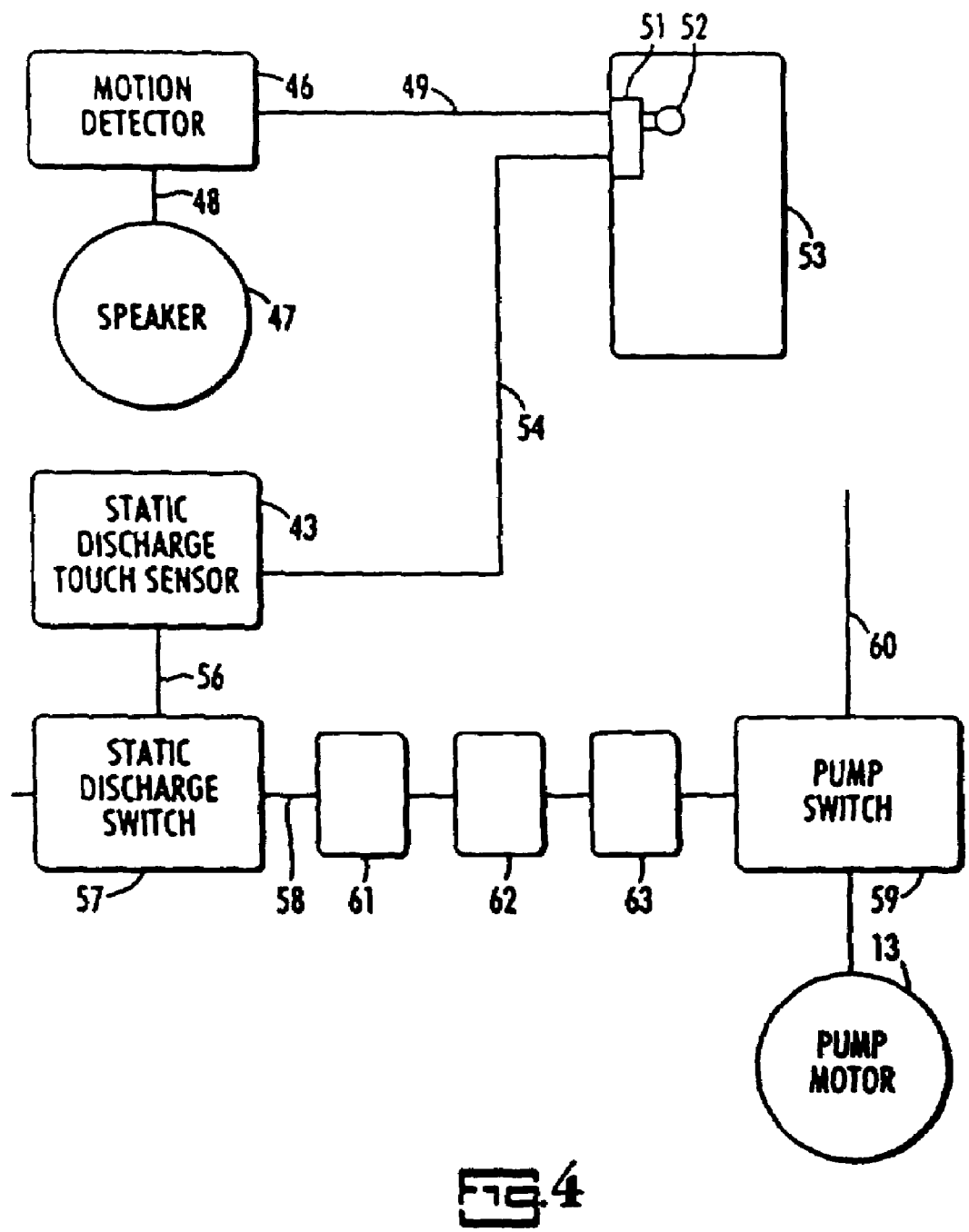
FIG. 4 shows a control system associated with the components of the fuel delivery and safety system of this invention.

FIGS. 3 and 4 illustrate a safety system having control apparatus preventing fuel delivery if the customer does not discharge his or her static electricity. Also included is apparatus for alerting the attendant to the presence of a customer and advising whether or not the customer has discharged his or her static electricity. The safety control apparatus includes a panel 41 with instructions concerning discharge of personal static electricity. The panel 41 is on or adjacent the fueling module at a height permitting hand engagement by a standing person. The panel 41 includes a hand engageable area 42 carrying a hand image which is made of a material having a resistance of $10^6$ to $10^{11}$ ohms and is appropriately grounded to discharge individual static electricity without creating a spark. A static discharge touch sensor 43 is positioned at the hand image. The panel also includes a motion detector 46 and a speaker 47.

The motion detector 46 is connected to a speaker or speaker apparatus 47 by a lead 48 and includes the necessary mechanism for delivering a recorded message from the speaker 47 audible to the person obtaining fuel from the pump module 11. The recorded message advises that fuel cannot be obtained until the customer places his or her hand on the hand image to discharge their static electricity. The motion detector 46 is also connected by a lead 49 to a switch 51 for a signal light 52 in a filling station attendant's cubicle 53. When the motion detector 46 detects the presence of a person, the switch 51 closes to cause the light 52 to go on. When the customer engages the static discharge area 42 the touch sensor 43 sends a signal via a lead 54 to the switch 51 causing the light to go out thereby informing the attendant that the customer has discharged his or her static electricity. A buzzer could be substituted for the light 52. The touch sensor 43 also delivers a signal via lead 56 to a static discharge or interruption switch 57 in an electric relay lead 58 from a source of electricity, not shown, to a solenoid operated gas pump motor switch 59 in the electric power supply lead 60 to the pump 13. A payment switch 61, a gasoline grade selection switch 62 and a nozzle switch 63 are also interposed in the solenoid power supply lead 58. The switches 57, 61, 62, 63 have a series relationship with one another and they all must be closed in order to run the pump motor 13 to deliver gas to the customer.

Figure 5:
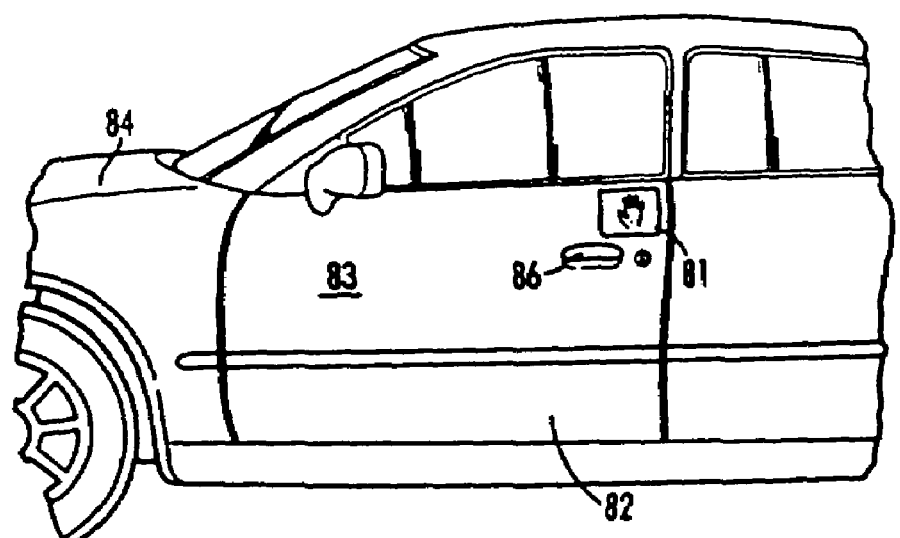
FIG. 5 shows a static discharge pad on the outside of the driver's side door of a vehicle.
Figure 6:
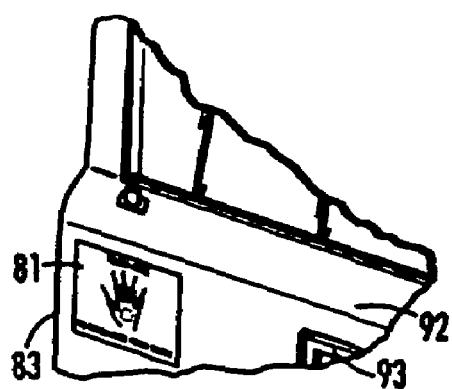
FIG. 6 is a pictorial view showing a static discharge pad on the inside of the driver's side door of a vehicle.
Figure 7:
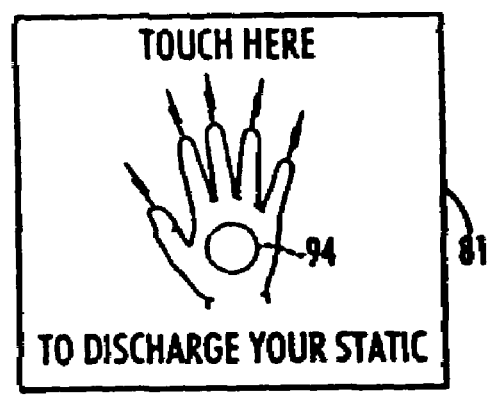
FIG. 7 is an enlarged view of the static discharge pad applied to the inside and outside of the door as shown in FIGS. 5 and 6.

Referring to the embodiment of the invention illustrated in FIG. 5, a static discharge pad or sign 81 is secured to the upper rear of the outside panel 82 of the driver's side door 83 of a vehicle 84 near the outside door handle 96. The door 83 is hinged at its front end to the chassis of the vehicle and the pad 81 is placed near the rear unhinged end of the door. FIG. 6 shows a static discharge pad 81 secured to the upper rear of an inside panel 92 of the door 83. The discharge pad 81 is between the inside door handle 93 and the rear end of the door 83. FIG. 7 shows the static discharge contact area 94 of the pad 81 and a preferred instructive wording for the discharge pad. The discharge pads 81 are grounded to the metal chassis of the vehicle and are made of a material which provides a sufficiently slow discharge of personal static electricity to avoid a spark when touched. Preferably the discharge pads 81 have a resistance of between $10^6$ and $10^{11}$ ohms.

The static discharge pads 81 are positioned on the door where the vehicle driver customarily places his hand or hands when leaving the vehicle. The static electricity of the driver is discharged in a safe manner, thus increasing the safety of a fueling operation. Static discharge pads may be placed on all the doors of the vehicle to insure static discharge of any passenger leaving the vehicle to perform a fueling operation.

Some of the foregoing features are disclosed in the following Disclosure Documents:

No. 512,690 entitled Electrostatic Dissipative Gasoline Fueling Warning Signs filed Jun. 3, 2003;

No. 514,236 entitled Electrostatic Dissipative Gasoline Fueling Warning Signs filed Jun. 27, 2002, and No. 518,587 entitled Electrostatic Dissipative Gasoline Fueling Warning Sign filed Sep. 19, 2002.

What is claimed is:

1. A method reducing fire hazard at a fueling station having a gasoline pump module including an electric pump motor and a relay operated switch controlling electric power to said motor comprising:

placing a grounded static discharge touch area near said pump module at a height permitting hand engagement of said touch area by a standing person, placing a motion detector near said gasoline pump module capable of detecting the presence of a person approaching said gasoline pump module to perform a fueling operation, providing a speaker having a recorded message which is automatically delivered by said speaker when said motion detector detects the presence of said person; said recorded message instructing said person to engage said touch area to discharge his or her personal static electricity prior to engaging in a fueling operation, providing a touch sensor at said static discharge touch area, providing a control circuit for said relay operated switch, providing an interruption switch in said control circuit having a normally open position and a closed position, and connecting said interruption switch to said static discharge touch sensor, said touch sensor, upon sensing a hand upon said touch area, causing said interruption switch to close.

2. The method of claim 1 wherein said touch area has a resistance between $10^6$ and $10^{11}$ ohms.

3. The method of claim 1 and further comprising:

providing an attendant's cubicle near said pump module and providing a signal device at said attendant's cubicle capable of generating a signal when activated, connecting said signal device to said motion detector, said signal device generating a signal when said motion detector senses the presence of a person.

4. The method of claim 8 and further comprising connecting said touch sensor to said signal device to generate a signal indicating a person's hand has engaged said touch area.

5. The method of claim 4 wherein said touch area has a resistance between $10^6$ and $10^{11}$ ohms.

6. A fueling station of the type having a fueling module and an electric fuel pump motor comprising:

a grounded static discharge touch area near said fueling module, a motion detector operable to detect the presence of a person approaching said fueling module, a speaker with a recorded message located near said fueling module, said motion detector causing said speaker to deliver said recorded message upon sensing the presence of a person, an attendant's module, a signal device in said attendant's module operatively associated with said motion detector, said signal device generating a signal to alert an attendant of the presence of a person when the presence of said person is sensed by said motion detector and a static discharge touch sensor at said touch area operatively associated with said signal device, said signal device alerting said attendant of the presence of a human touch of said touch area.

7. The fueling station of claim 6 wherein said touch area has a resistance between $10^6$ and $10^{11}$ ohms.

8. The fueling station of claim 6 and further comprising a source of electricity, a power supply lead from said source of electricity to said pump motor, an electric relay switch in said power supply lead, a relay lead connecting the relay of said relay switch to said source of electricity and a static discharge switch in said relay lead said touch sensor being connected in controlling relation to said static discharge switch so as to permit said gasoline pump to run only if said touch sensor senses human contact.

9. The fueling station of claim 8 wherein said touch area has a resistance between $10^6$ and $10^{11}$ ohms.

10. A fueling station of the type having a fueling module and an electric fuel pump motor, comprising a grounded static discharge touch area near said fueling module a touch sensor at said touch area operable to sense the presence of a human when touched by said human, a source of electricity, a power supply lead connecting said fuel pump motor to said source of electricity, an electric relay switch in said power supply lead a relay lead connecting the relay of said relay switch to said source of electricity, a static discharge switch in said relay lead having open and closed positions and an electrical connection between said touch sensor and said static discharge switch, said static discharge switch being closed to permit the flow of electricity when said touch sensor is touched by said human.

11. The fueling station of claim 10 wherein said touch area has a resistance between $10^6$ and $10^{11}$ ohms.

* * * * *